United States Patent
Yu et al.

(10) Patent No.: US 10,192,402 B1
(45) Date of Patent: *Jan. 29, 2019

(54) AD SERVING OFFERS AND NEW GAME PROMOTIONS OUTSIDE THE GAME MODULE WITH BUSINESS INTELLIGENCE BASED ON PORTFOLIO OF GAMES

(71) Applicant: Electronic Arts Inc., Redwood City, CA (US)

(72) Inventors: Wendy Yu, San Francisco, CA (US); Jonathan Calipes, Emeryville, CA (US); Daniel Helmhold, San Francisco, CA (US); Jennifer J. Lee, Millbrae, CA (US); Deepak Polamarasetty, Castro Valley, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,303

(22) Filed: May 26, 2017

Related U.S. Application Data

(63) Continuation of application No. 13/953,701, filed on Jul. 29, 2013, now Pat. No. 9,666,029.

(51) Int. Cl.
 *G07F 17/32* (2006.01)
 *A63F 13/50* (2014.01)
(52) U.S. Cl.
 CPC .......... *G07F 17/3255* (2013.01); *A63F 13/50* (2014.09)
(58) Field of Classification Search
 CPC ..... A63F 13/61; G06Q 30/02; G06Q 30/0209
 See application file for complete search history.

(56) References Cited

U.S. PATENT DOCUMENTS 7,458,892 B2   12/2008   Walker
8,221,223 B2    7/2012   Walker
(Continued)

OTHER PUBLICATIONS

Kincaid, Jason, "Bodega: A Cross-Platform Marketplace That Lets Gamers Swap Virtual Currencies for Cash", URL: <https://techcrunch.com/2009/11/04/bodega-a-cross-platform-marketplace-that-lets-gamers-swap-virtual-currencies-or-cash/>, Nov. 4, 2009, 2 pages.

(Continued)

*Primary Examiner* — Jay Liddle
*Assistant Examiner* — Alex F. R. P. Rada, II
(74) *Attorney, Agent, or Firm* — Knobbe, Martens, Olson & Bear, LLP

(57) ABSTRACT

An online gaming system providing dynamic delivery of advertisements to users of an online game. The system may dynamically select advertisement for delivery based on one or more user parameters which characterize the user's activity with the online game. The system may comprise one or more processors configured to execute computer program modules. The system may include a game module configured to execute an instance of an online game and to implement the instance of the online game to facilitate participation of users in the online game. The system may include a user monitor module configured to monitor user activity parameters. The system may include a potential offer module configured to manage multiple incentive offers which are available for delivery to the users of the online game. The system may include an offer determination module configured to select incentive offers to be delivered to the users of the online game from the multiple incentive offers based on the monitored activity parameters of the users.

22 Claims, 3 Drawing Sheets

(56) References Cited

U.S. PATENT DOCUMENTS

| | | |
|---|---|---|
| 8,239,487 B1 | 8/2012 | Hoffman |
| 8,287,383 B1 | 10/2012 | Etter |
| 8,292,743 B1 | 10/2012 | Etter |
| 8,382,581 B2 | 2/2013 | Fargo |
| 8,439,759 B1 | 5/2013 | Mello |
| 8,443,039 B2 | 5/2013 | Hoffman |
| 8,454,442 B2 | 6/2013 | VanLuchene |
| 8,469,801 B2 | 6/2013 | Ocko |
| 8,510,413 B1 | 8/2013 | Hoffman |
| 8,924,308 B1 | 12/2014 | Mehta |
| 2002/0072412 A1 | 6/2002 | Young |
| 2002/0077169 A1 | 6/2002 | Kelly |
| 2003/0003983 A1 | 1/2003 | Walker |
| 2006/0089874 A1 | 4/2006 | Newman |
| 2006/0178966 A1 | 8/2006 | Jung |
| 2007/0111770 A1 | 5/2007 | Van Luchene |
| 2007/0167210 A1 | 7/2007 | Kelly |
| 2007/0243928 A1 | 10/2007 | Iddings |
| 2008/0090659 A1 | 4/2008 | Aguilar |
| 2009/0029769 A1 | 1/2009 | Muller |
| 2009/0164287 A1 | 6/2009 | Kies |
| 2009/0247282 A1 | 10/2009 | Cheng |
| 2009/0313556 A1 | 12/2009 | Hamilton, II |
| 2010/0121729 A1 | 5/2010 | Betzler |
| 2010/0223115 A1 | 9/2010 | Chodosh |
| 2011/0264489 A1 | 10/2011 | Ganetakos |
| 2011/0300923 A1 | 12/2011 | VanLuchene |
| 2011/0302037 A1 | 12/2011 | Sutton-Shearer |
| 2011/0319169 A1 | 12/2011 | Lam |
| 2012/0122586 A1 | 5/2012 | Kelly |
| 2012/0157212 A1 | 6/2012 | Kane |
| 2012/0178515 A1 | 7/2012 | Adams |
| 2012/0225723 A1 | 9/2012 | Webster |
| 2012/0244950 A1 | 9/2012 | Braun |
| 2012/0259698 A1 | 10/2012 | Yurow |
| 2012/0265604 A1 | 10/2012 | Corner |
| 2012/0289330 A1 | 11/2012 | Leydon |
| 2012/0289346 A1 | 11/2012 | VanLuchene |
| 2012/0323683 A1 | 12/2012 | Feldman |
| 2012/0329560 A1 | 12/2012 | Kelly |
| 2013/0036064 A1 | 2/2013 | Osvald |
| 2013/0036373 A1 | 2/2013 | Alderfer |
| 2013/0046621 A1 | 2/2013 | Asseoff |
| 2013/0072308 A1 | 3/2013 | Peck |
| 2013/0079131 A1 | 3/2013 | Lam |
| 2013/0079145 A1 | 3/2013 | Lam |
| 2013/0130781 A1 | 5/2013 | Anderson |
| 2013/0138489 A1 | 5/2013 | Fargo |
| 2013/0159086 A1 | 6/2013 | Richard |
| 2013/0226694 A1 | 8/2013 | Boyd |
| 2013/0231999 A1 | 9/2013 | Emrich |
| 2013/0252727 A1 | 9/2013 | Ocko |
| 2013/0339111 A1 | 12/2013 | Ross |
| 2013/0344968 A1 | 12/2013 | Halfteck |
| 2014/0080590 A1 | 3/2014 | Link |
| 2014/0128153 A1 | 5/2014 | Driemeyer |
| 2014/0164142 A1 | 6/2014 | Yang |
| 2014/0194197 A1 | 7/2014 | Graziosi |
| 2014/0248943 A1 | 9/2014 | Burgin |
| 2015/0056949 A1 | 2/2015 | Matsumura |

OTHER PUBLICATIONS

Bodega: Cross Platform Virtual Marketplace, URL: <http://tech.co/bodega-cross-platform-virtual-marketplace-2010-04>, Apr. 12, 2010, 2 pages.

SwapMob Raises $1M for In-Game Virtual Goods Marketplace (Exclusive), URL: <http://venturebeat.com/2013/07/25/swapmob-raises-1m-for-in-game-virtual-goods-marketplace/>, 3 pages.

World of Warcraft published by Blizzard Entertainment on Nov. 23, 2004 (see attached screenshot); YouTube video "Wow Feenix Trade faker" uploaded on Jan. 6, 2011 by Gyorgy Schweitzer (https://www.youtube.com/watch?v=CrCht0XAdMA) (see attached screenshot), 2 pages.

Ann Arbor's BodegaBid Bets There's Real Profit in Virtual Currency, URL: <http://www.xconomy.com/detroit-ann-arbor/2010/11/08/ann-arbors-bodegabid-bets-theres-real-profit-in-virtual-currency/>, 3 pages.

Kincaid, Jason, "Bodega: A Cross-Platform Marketplace That Lets Gamers Swap Virtual Currencies for Cash", URL: <https://techcrunch.com/2009/11/04/bodega-a-cross-platform-marketplace-that-lets-garners-swap-virtual-currencies-for-cash/>, Nov. 4, 2009, 2 pages.

AD SERVING OFFERS AND NEW GAME PROMOTIONS OUTSIDE THE GAME MODULE WITH BUSINESS INTELLIGENCE BASED ON PORTFOLIO OF GAMES

FIELD OF THE DISCLOSURE

This disclosure relates to systems and methods for serving advertising content to users of an online game, and more particularly to serving advertisement content based on one or more user parameters.

BACKGROUND

Serving advertisements to users in an online space is well known. Advertisements can be serviced as in-page banner ads, through email, in-game messaging, and/or other messaging services, and/or other service.

Advertisements and other information presented to users is most beneficial when the information served is relevant to the user, resulting in the user being more engaged by the advertisements and more likely to carry out the task or action conveyed in the presented advertisements and/or other presented information. However, determining relevancy of advertisements and other information in order to engage users is quite a difficult task.

Business intelligence information provides online game service providers with historical, current and predictive views of user behavior and/or activity such as spending (virtual or real), rate of play, and others.

SUMMARY

One aspect of the disclosure relates to an online gaming system for dynamically serving advertisements to users based on user parameters. The system may comprise one or more processors configured to execute computer program modules. The computer program modules may comprise one or more of a game module, a user monitor module, a potential offer module, an offer determination module, and/or other modules.

The game module may be configured to execute an instance of an online game. the game module may be configured to implement the instance of the online game to facilitate participation of users in the online game.

The user monitor module may be configured to monitor user activity within the online game. Monitoring user activity may include monitoring one or more user activity parameters. User activity parameters may include parameters that characterize one or more of past spending by the users on virtual items, past user interaction with game related tasks, user progress with one or more overall game related objectives, user interest in the game, past in-game communications including player-to-player communications, and/or other parameters. The user monitor module may monitor activity parameters of a first user and activity parameters of a second user The potential offer module may be configured to manage multiple incentive offers which are available for delivery to the users of the online game. The advertisements and content thereof may include incentive offers, and/or other types of offers. The offers may include incentives corresponding to the online game. The offers may include incentives corresponding to one or more different online games. The offers may include a first incentive offer including an incentive corresponding to the online game, a second incentive offer including an incentive corresponding to a first different online game, and/or other offers.

The offer determination module may be configured to select the incentive offers to be delivered to the users of the online game from the multiple incentive offers. The selection of offers may be based on the monitored activity parameters of the users. The offer determination module may be configured to select the first incentive offer for delivery to the first user based on the monitored activity parameters of the first user. The offer determination module may be configured to select the second incentive offer for delivery to the second user based on the monitored activity parameters of the second user.

Another aspect of the disclosure relates to a method for dynamically serving advertisements to users of an online game. The selections of advertisements to be delivered to the users may be based on one or more user parameters. The method may be implemented in a computer system that includes one or more physical processors and storage media storing machine-readable instructions. The method may comprise the steps of: executing an instance of an online game, monitoring user activity within the online game, managing multiple incentive offers which are available for delivery to the users, selecting incentive offers for delivery to the users based on the monitored user activity, and/or other operations.

Executing an instance of an online game may comprise implementing the instance of the online game to facilitate participation of users in the online game.

Monitoring user activity may comprise monitoring user activity parameters that characterize one or more of past spending by the users on virtual items, past user interaction with game related tasks, user progress with one or more overall game related objectives, user interest in the game, past in-game communications including player-to-player communications, and/or other parameters. Monitoring activity parameters may comprise monitoring user activity parameters a first user and user activity parameters of a second user.

Managing the multiple incentive offers which are available for delivery to the users of the online game may comprise managing offers including incentives corresponding to the online game. Managing the incentive offers may include managing offers including incentives corresponding to one or more different online games. The offers may include a first incentive offer including an incentive corresponding to the online game, and a second incentive offer including an incentive corresponding to a first different online game.

Selecting incentive offers to be delivered to the users of the online game from the multiple incentive offers based on the monitored activity parameters of the users may include selecting the first incentive offer for delivery to the first user based on the monitored activity parameters of the first user, and selecting the second incentive offer for delivery to the second user based on the monitored activity parameters of the second user These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
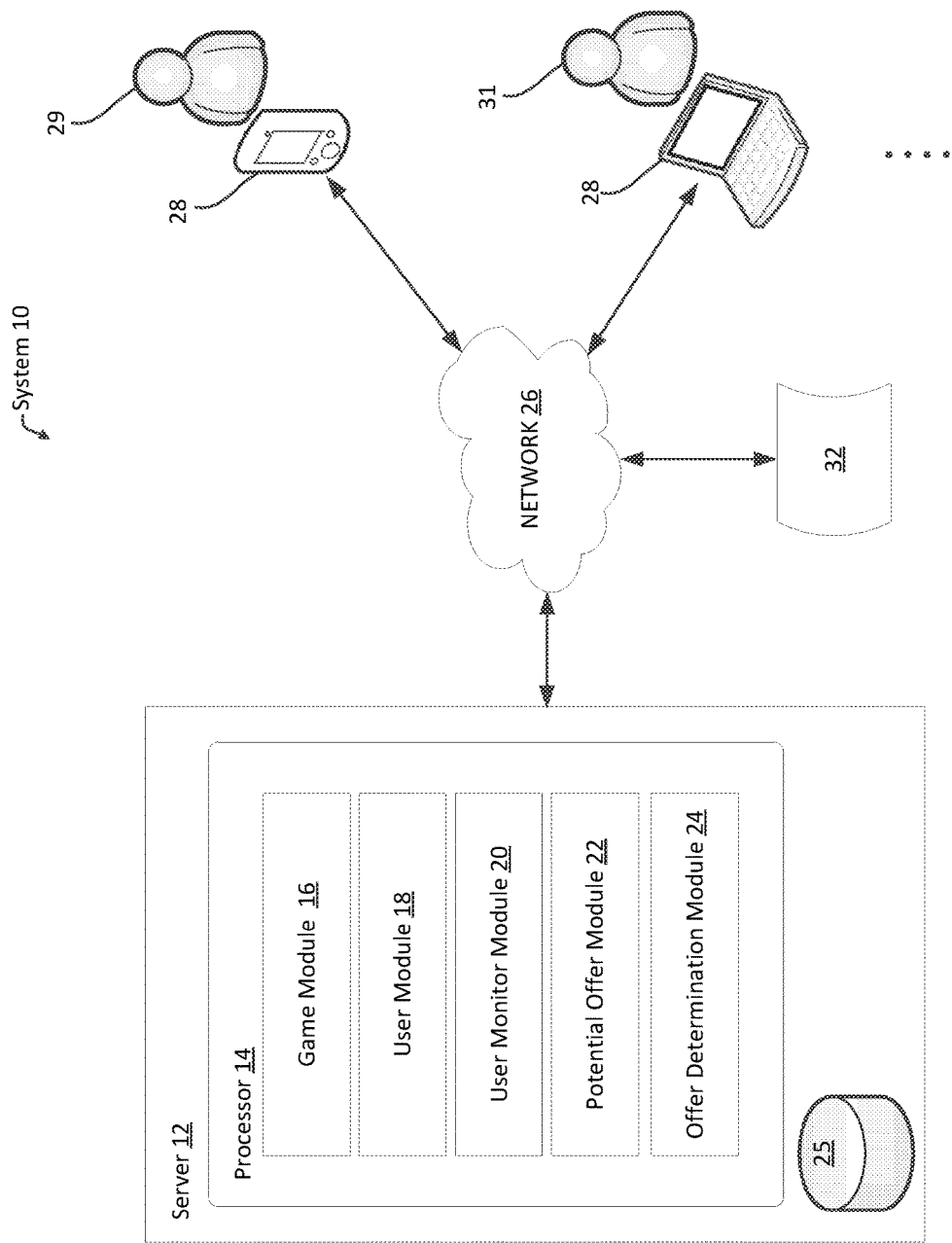
FIG. 1 illustrates a system for serving advertisement content to users of an online game.

FIG. 1 illustrates a system 10 configured to dynamically sever advertisement content to users of a virtual environment. A virtual environment may include, for example, an online game. The system 10 may be configured to serve the advertisement content dynamically to the users based on one or more user parameters. The advertisements and content thereof may include incentive offers, and/or other types of offers. The incentive offers may comprise one or more of in-game incentives, cross-promotional incentives, and/or other incentive type offers. In-game incentives may include incentives which aim to maintain and/or build user activity with the present online game played by the user. Cross-promotional incentive may include incentives which aim to build user activity with a different online game (e.g., one or more other games within the virtual environment and/or other games within other virtual environments).

An incentive may include giving the user one or more of virtual items, discounts on purchases, virtual currency, a status, an upgrade, a bonus, a reward, bundles, packages, and/or other offer to enhance gameplay in exchange for completing and/or attempting to complete an action. An action may be one or more of beating a level, spending currency (virtual or real), achieving a status, logging into a user account, creating a user account, registering to play a game, and/or other action resulting in receiving the incentive being offered. For example, without implying limitations, an incentive offer corresponding to the online game may include "Beat level 2 and receive 100 coins!" An incentive offer corresponding to a different online game may include, "Register to play ARCANE EMPIRES and you will automatically be upgraded to level 3!" It is noted that these example descriptions of offers including incentives are purely illustrative. The various offers may be described in other ways, and/or may include other incentive offers to enhance gameplay in exchange for completing and/or attempting to complete other action requirements.

The system 10 may be configured to select the type of incentive offer to deliver to the users based on the user activity within the online game. Offers including incentives corresponding to the online game may be selected for users who are indicated as being active in the online game, wherein such incentives are intended to encourage the user to continue activity within the online game and/or encourage more activity within the game, to enhance the gameplay experience in the online game. Offers including incentives corresponding to the online game may also be selected for users who are indicated as being inactive in the online game and/or that their activity in the game is likely to lapse, wherein such incentives are intended to encourage the user to be more active within the online game. Offers including incentives corresponding to the different online games may be selected for users who are generally considered inactive, that their activity in the game is likely to lapse, and/or for users who are unresponsive to previous offers corresponding to the online game, wherein such offers may encourage the user to play a different game such that the user may be more active in the other game than in the current game.

The system 10 may be configured to monitor the user activity and indicate whether the user is generally active, inactive, or that their activity is likely to lapse. Monitoring user activity may include monitoring user activity parameters. User activity parameters may relate to, for example, the spending of currency (e.g., virtual and/or real) by the users in the online game and/or different online games, user interaction with game related tasks presented in the online game, user progress with one or more game related objectives, user interest in the online game, in-game communications by the user, and/or other information and/or parameters related to the activity of the users within the online game and/or other different online games.

In FIG. 1, providing the virtual environment may include hosting the virtual environment over a network 26, such as the Internet. A host server may include one or more processors configured to execute one or more computer modules for implementing an instance of an online game and to facilitate the participation of one or more users in the online game. The host server may be a game server 12.

The computer program modules may include one or more of a game module 16, a user module 18, a user monitor module 20, a potential offer module 22, an offer determination module 24, and/or other modules. The server 12 may be configured to communicate with one or more client computing platforms 28, according to client/server architecture. The client computing platforms 28 can include, for example, a cellular telephone, a smartphone, a laptop, a tablet computer, a desktop computer, a television set-top box, smart TV, a gaming consul, and/or other device. The users may access system 10 and/or the virtual environment via client computing platforms 28.

The game module 16 may be configured to implement an instance of the virtual environment executed by the computer modules to determine state of the virtual environment. The state may then be communicated (e.g., via streaming visual data, via object/position data, and/or other state information) from server 12 to client computing platforms 28 for presentation to users. The state determined and transmitted to a given client computing platform 28 may correspond to a view for a user character being controlled by a user via input devices (e.g., a controller) at the given client computing platform 28. The state determined and presented to a given client computing platform 28 may correspond to a location in the virtual environment (e.g., location in the game). The view described by the state for the given client computing platform 28 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

An instance of the virtual environment may comprise a simulated environment that is accessible by users via clients (e.g., client computing platforms 28) that present the views of the virtual environment to a user. The simulated environment may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein). An instance executed by the computer modules may be synchronous, asynchronous, and/or semi-synchronous.

The above description of the manner in which state of the virtual environments is determined by game module 16 is not intended to be limiting. The game module 16 may be configured to express the virtual environment in a more limited, or more rich, manner. For example, views determined for the virtual environment representing the state of the instance of the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 16, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment). The user controlled elements controlled by and/or associated with a given user may be created and/or customized by the given user. The user may have an "inventory" of virtual items and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through client computing platforms 28. The users may interact with each other through communications exchanged within the virtual environment. Such communications may include one or more of textual chat, instant messages, private messages, voice communications, and/or other communications. Communications may be received and entered by the users via their respective client computing platforms 28. Communications may be routed to and from the appropriate users through server 12 (e.g., through game module 16) and/or through communications which are external to the system 10 (e.g., text messaging service within the client computing platforms 28).

The user module 18 may be configured to access and/or manage one or more user profiles and/or user information associated with users of the system 10. The one or more user profiles and/or user information may include information stored by server 12, one or more of the client computing platforms 28, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

The user module 18 may be configured to manage the user's "inventory" of virtual items and/or currency that the users can use within the virtual space. A user may have a game "inventory" of one or more virtual items and/or currency that the user can use (e.g., by manipulation of one or more user characters or other user controlled element, and/or other items) to perform in-game actions within the virtual space. The inventory can be determined on a game-to-game basis for one or more games available within the virtual space, or for one or more games in one or more other virtual spaces. The inventory may encompass multiple inventories of virtual items across multiple games played by the user.

The user monitor module 20 may be configured to monitor user activity within the online game. Monitoring user activity may include monitoring one or more user activity parameters. The user activity parameters may characterize one or more of past spending by the users on virtual items, past user interaction with game related tasks, user progress with one or more overall game related objectives, user interest in the game, past in-game communications including player-to-player communications, and/or other activity parameters.

The user activity parameters may include user spend parameters that characterizes past spending by the users. User spend parameters that characterize past spending by the users may include one or more of spend velocity, spend frequency, total (or lifetime) spending, and/or other parameters. The spend parameters may characterize spending by a user within the present virtual environment (e.g., the online game) and/or in other different virtual environments (e.g., different online games).

Spend velocity may provide quantification of an amount of currency (real or virtual) spent by the user per unit time. Spend frequency may quantify a number of purchases completed per unit time. A total spend amount may quantify a total amount spent (e.g., lifetime spending, or other amount) by the user. One or more spend parameters may characterize average spending by the user at content driven points in one or more games. Examples of this may include, average spend during quest related in-game activities, average spend during player to player battles, and/or spend during other types of in-game activities and/or tasks.

User spend parameters may indicate and/or include user spend parameters on an item-to-item bases (e.g. when the user buys swords). User spend parameters may indicate and/or include user spend parameters on purchases of a particular group of items (e.g. tracking when user buys weapons). User spend parameters may indicate and/or include user spend parameters on any purchase (e.g., within the instance of the game, one or more other games within the virtual environment, one or more other games within other virtual spaces, and/or within other mechanisms for purchase).

The user activity parameters may include user interaction parameters that characterizes past interaction of the users with game related tasks. Game related tasks may include any task presented to the users of the online game which may be different than an overall objective of the online game. For example, game related tasks may include one or more of the task of collecting one or more virtual items, purchasing one or more virtual items, obtaining a "status", defeating one or more enemies, obtaining an amount of virtual currency, interacting with one or more other users of the online game, and/or other tasks related to the game.

The user activity parameters may include user progress parameters that characterize user progress with one or more overall game related objectives. A users progress with overall game related objectives may include one or more of the users progress in finishing all the levels, defeating all of the enemies, obtaining all of the virtual items, obtaining all of the "statuses", and/or progress with other overall objectives related to the online game. Progress may be considered on an overall (e.g. lifetime) bases, per unit time, per log-in session (e.g., levels completed per log-in), and/or other consideration.

The user activity parameters may include user interest parameters that characterize user interest in the game. User interest can be determined in a variety of ways. User interest may be determined by one or more of the frequency and/or amount the user logs into the virtual environment (e.g., log-in to an account related to the online game), the responsiveness of the users to prior advertisements, promotions, and/or incentive offers, and/or other mechanisms for determining interest.

The user activity parameters may include user communications parameters that characterizes past in-game communications by the users. In-game communications may include in-game player-to-player communications. Player-to-player communications may be provided by services internal and/or external to the system 10 as described previously. Communications may include textual chat, instant messages, private messages, voice communications, a message board, a blog, a forum, and/or other communications mechanisms which are internal and/or external to the system 10. The user communications parameter may characterize user activity with one or more of these services.

Figure 2:
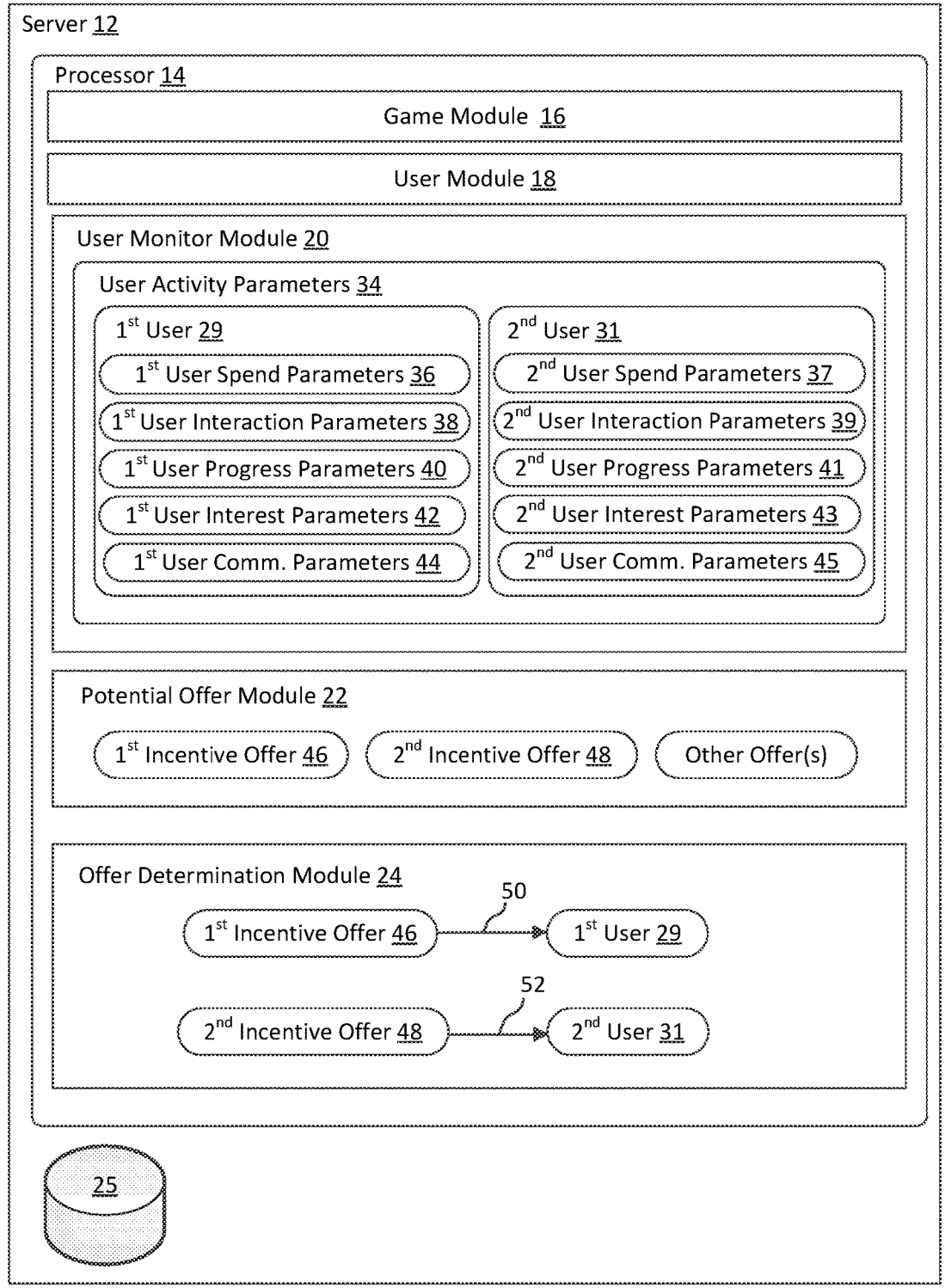
FIG. 2 illustrates in more detail a server employed within the system of FIG. 1.

By way of illustration, in FIG. 2, the user monitor module 20 may monitor user activity parameters 34 for a first user 29 and a second user 31. The user activity parameters 34 for the first user 29 may include one or more of first user spend parameters 36, first user interaction parameters 38, first user progress parameters 40, first user interest parameters 42, first user communications parameters 44, and/or other parameters. The user activity parameters 34 for the second user 31 may include one or more of second user spend parameters 37, second user interaction parameters 39, second user progress parameters 41, second user interest parameters 43, second user communications parameters 45, and/or other parameters.

Returning to FIG. 1, the monitoring of the user activity parameters by the user monitor module 20 may indicate whether or not the activity of the users in the online game is likely to lapse. An indication in lapse of user activity may include indicating that the users activity in the online game is likely to completely cease (e.g., the user stops playing the game), to substantially decrease (e.g., the user rarely plays the game), and/or other considerations.

Manners in which user activity parameters indicate levels of activity can include a variety of techniques. Indicating activity lapse may consider the user activity parameters individually, the aggregate of multiple user activity parameters, and/or other considerations.

Considering user activity parameters individually may indicate one or more of a quantitative or qualitative activity level and likelihood of activity lapse. The likelihood of lapse may be due to the user monitor module 20 indicating that the individual user activity parameters show qualities of one or more of decreasing over time, are lower than a threshold value, and/or by other considerations.

For example the user monitor module 20 may indicate a likelihood of activity lapse by considering a user spend parameter individually. The user spend parameter maybe one or more of the spend velocity parameter, spend frequency parameter, and/or a total spending parameter associated with user spend parameters, and/or other mechanism to define a spend parameter. A user spend parameter decreasing over time may include, for example without implying limitations, indicating that at a time prior to the current instance of monitoring the user activity parameters, the user spent at an average frequency of 5 purchases per week (or other amount), and more recently (e.g., at or around the current instance of monitoring), the user spends at an average of 1 purchase per week (or other amount). Thus, such monitoring may indicate that the user is becoming less active in the game (e.g., since they are spending less frequently), and that their activity in the game is likely to lapse in the near future. Indicating a user spend parameter being lower than a threshold value may include comparing the monitored user spend parameter to a threshold value. For example, the user monitor module 20 may set a spend frequency threshold value being at minimum 2 purchases per week (or other value), and in accordance with the above example if it is currently indicated that the user spends an average of 1 purchase per week (or other value less than a threshold minimum), the user activity monitored by the user monitor module 20 may indicate a likelihood of activity lapse by this user.

As an illustrative example, referring now to FIG. 2 the user monitor module 20 may indicate, based on the first user spend parameter 36 for the first user 29 being indicative of a likelihood to maintain activity and the second user spend parameter 37 for the second user 31 being indicative of likelihood of lapse in activity, that the activity of the second user 31 in the online game may be more likely to lapse than the activity of the first user 29.

Returning to FIG. 1, the user monitor module 20 may indicate a likelihood of activity lapse by considering a user interaction parameter individually. A user interaction parameter decreasing over time may include, for example without implying limitations, a decrease in user interaction with game related tasks. The user monitor module 20 may indicate, for example, that at a time prior to the current instance of monitoring, the user completed and/or attempted to complete 10 game related tasks per log in (or other amount), however, more recently the user monitor module 20 may indicate the user completes and/or attempts to complete 3 game related tasks per log in (or other amount). Thus, such monitoring may indicate that the user is becoming less active in the game (e.g., since they are completing and/or attempting to complete less level per log-in), and that their activity in the game is likely to lapse in the near future. A user interaction parameter being lower than a threshold value may include comparing the recently monitored user interaction parameter with a threshold value set by the user monitor module 20. For example, the user monitor module 20 may set a threshold interaction parameter of being a minimum of completing and/or attempting to complete 5 game related tasks per log-in (or other amount). In accordance with the current example, if it is currently indicated that the user completes and/or attempts to complete 3 game related tasks per log-in (or other value less than a threshold minimum), the user interaction parameter monitored by the user monitor module 20 may indicate a likelihood of activity lapse by the user.

As an illustrative example, referring now to FIG. 2 the user monitor module 20 may indicate, based on the first user interaction parameter 38 for the first user 29 being indicative of a likelihood to maintain activity and the second user interaction parameter 39 for the second user 31 being indicative of likelihood of lapse in activity, that the activity of the second user 31 in the online game may be more likely to lapse than the activity of the first user 29.

Returning to FIG. 1, the user monitor module 20 may indicate a likelihood of activity lapse by considering a user progress parameter individually. A user progress parameter decreasing over time may include, for example without implying limitations, a decrease in user progress with game related objectives. The user monitor module 20 may indicate that at a time prior to the current instance of monitoring, that the user completed and/or attempted to complete 4 game levels per log in (or other amount), however, more recently the user monitor module 20 may indicate the user completes and/or attempts to complete 1 game level per log in (or other amount). Thus, such monitoring may indicate that the user is becoming less active in the game and that their activity in the game is likely to lapse in the near future. A user interaction parameter being lower than a threshold value may include comparing the recently monitored user interaction parameter with a threshold value set by the user monitor module 20. For example, the user monitor module 20 may set a threshold progress parameter of being a minimum of completing and/or attempting to complete 3 game levels per log-in (or other amount). In accordance with the above exemplary situations, if it is currently indicated that the user completes or attempts to complete 1 game level per log-in, the user progress parameter monitored by the user monitor module 20 may indicate a likelihood of activity lapse by the user.

As an illustrative example, referring now to FIG. 2 the user monitor module 20 may indicate, based on the first user progress parameter 40 for the first user 29 being indicative of a likelihood to maintain activity and the second user progress parameter 41 for the second user 31 being indicative of likelihood of lapse in activity, that the activity of the second user 31 in the online game may be more likely to lapse than the activity of the first user 29.

Returning to FIG. 1, the user monitor module 20 may indicate a likelihood of activity lapse by considering a user interest parameter individually. A user interest parameter decreasing over time may include, for example without implying limitations, a decrease in use interest such that the user monitor module 20 may indicate that at a time prior to the current instance of monitoring, that the user was more interested in the online game, however, more recently the user monitor module 20 indicates the is less interested in the online game. Again, user interest may be one or more of the frequency of log-in into the online game and/or past positive responses by the user to incentive offers corresponding to the online game. Thus, such monitoring may indicate that the user is becoming less active (e.g., less interest) in the game and that their activity in the game is likely to lapse in the near future. A user interest parameter being lower than a threshold value may include comparing the recently monitored user interest parameter with a threshold value set by the user monitor module 20. For example, the user monitor module 20 may set a threshold interest parameter of being a minimum of positively responding to at least 50% (or other value) of the offers delivered to the user corresponding to incentives for the online game. If the user does not meet the threshold, the user interest parameter monitored by the user monitor module 20 may indicate a likelihood of activity lapse by the user.

As an illustrative example, referring now to FIG. 2 the user monitor module 20 may indicate, based on the first user interest parameter 42 for the first user 29 being indicative of a likelihood to maintain activity and the second user interest parameter 43 for the second user 31 being indicative of likelihood of lapse in activity, that the activity of the second user 31 in the online game may be more likely to lapse than the activity of the first user 29.

Returning to FIG. 1, the user monitor module 20 may indicate a likelihood of activity lapse by considering a user communications parameter individually. A user communications parameter decreasing over time may include, for example without implying limitations, a decrease in player-to-player communications by the user. The user monitor module 20 may indicate that at a time prior to the current instance of monitoring, that the user communicated with 8 other players, however, more recently the user monitor module 20 may indicate that the user communicates with 2 other players. Thus, such monitoring may indicate that the user is becoming less active in the game and that their activity in the game is likely to lapse in the near future. A user communications parameter being lower than a threshold value may include comparing the recently monitored user communications parameter with a threshold value set by the user monitor module 20. For example, the user monitor module 20 may set a threshold communications parameter of being a minimum of communicating with 4 other players. If the user does not meet the threshold, the user communications parameter monitored by the user monitor module 20 may indicate a likelihood of activity lapse by the user.

As an illustrative example, referring now to FIG. 2 the user monitor module 20 may indicate, based on the first user communications parameter 44 for the first user 29 being indicative of a likelihood to maintain activity and the second user communications parameter 43 for the second user 31 being indicative of likelihood of lapse in activity, that the activity of the second user 31 in the online game may be more likely to lapse than the activity of the first user 29.

Returning to FIG. 1, user activity parameters may be considered qualitatively, quantitatively, and/or by other considerations. Indications of activity lapse may be considered quantitatively with reference to an activity scale. For example, a scale may include a numerical scale from 0 to 10, wherein 0 represents "No activity" by the users, and 10 represents "Fully active" participation by the users in the online game. This and/or other technique for quantitative measurement of user activity may be applied to by the system when indicating whether or not user activity is likely to lapse, as described previously. For example, a user having a user spend parameter of 10 purchases per week, and if the user monitor module 20 sets a threshold of 2 purchases per week, this user may be considered as having 10/10 spend activity, since the user spend parameter exceeds (by any amount) the threshold minimum. The numbering of activity levels, and/or the number of levels described herein is purely illustrative. The various levels may be enumerated in other ways, and/or may include more or less levels.

User activity parameters may be considered qualitatively. Examples of qualitative activity levels may include describing users as being one or more of "Very Active", "Moderately Active", "Minimally Active", "Not Active", and/or other qualitative description. The user monitor module 20 may employ other qualitative methods and/or techniques for determining levels of user activity. The level of user activity either qualitatively or quantitatively may consider user activity parameters individually or as an aggregate as described previously. For example, the user monitor module 20 may indicate a user communications parameter of 1 player-to-player communication, and if the user monitor module 20 sets a threshold minimum of 5 player-to-player communications, this user may be considered "Minimally Active" since the user communications parameter is below the threshold minimum. The qualitative descriptions of activity level described herein are purely illustrative. The various levels may be described in other ways, and/or may include more or less levels.

Indicating activity lapse may consider the aggregate of multiple user activity parameters. An aggregate of multiple user activity parameters may include two or more user activity parameters. Considering the aggregate may include considering an activity level which is "averaged" from the multiple user activity parameters. Considering the aggregate may include considering the "averaged" activity level wherein one or more of the user activity parameters are weighted differently.

An aggregate of multiple user activity parameters may be considered via an "average". By way of illustration, a user may have a user spend parameter which indicates "Minimally Active", a user progress parameter which indicates "Moderately Active", and a user communications parameter which indicates "Not active", such that an "average" activity could be discerned as being generally more inactive than active (e.g., two parameters indicating less activity while only one parameter indicates moderate activity). Therefore in this example, the user monitor module 20 may indicate that this user's activity is likely to lapse. By way of another illustration, a user may have a user interaction parameter which indicates "Very Active", a user progress parameter which indicates "Moderately Active", and a user communications parameter which indicates "Not active"; such that an "average" activity could be discerned as being generally more active then not (e.g., two parameters indicating activity while only one parameter indicates no activity). Therefore in this example, the user monitor module 20 may indicate that this user's activity is not likely to lapse. Again, these examples described herein are purely illustrative and are not intended to be limiting. The various "average" levels may be described in other ways, and/or may be discerned by other considerations of the user activity parameters.

An aggregate of multiple user activity parameters may be considered via a "weighted average" wherein certain user activity parameters are given more weight than others. For example, user progress parameter, user interest parameter, and user spend parameter (and/or other parameters) may be given more weight than other user activity parameters when considering an average. This may be due to the consideration of progress with game objects, frequency of log-in, and spending within the game being a core part of the gameplay (e.g., for example, users have to log-in and beat levels to play a game), while communications with other players and/or interaction with tasks which are not part of an overall game objective are activities which are performed merely by user preference. By way of illustration, a user may have a user communications parameter which indicates "Not active", and a user progress parameter which indicates "Moderately active", such that the user progress parameter would take precedence when indicting an average user activity level. Therefore in this example, the user monitor module 20 may indicate that the user is at average "Moderately active" despite no activity with player-to-player communications.

The potential offer module 22 may be configured to manage multiple offers which are available for delivery to the users of the online game. The individual offers may include incentive type offers and/or offers of other types. Offers including incentives may be one or more of offers including incentives corresponding to the online game and incentives corresponding to one or more different online games. The offers including incentives corresponding to one or more different online games may include offer corresponding to games which the users have played at least once. The offers including incentives corresponding to one or more different online games may include offers corresponding to games which the users have not played.

For example, referring to FIG. 2, the potential offer module 22 may be configured to manage a first incentive offer 46 and a second incentive offer 48. The first incentive offer 46 may include an incentive corresponding to the online game which aims to maintain and/or build user activity within the online game. The second incentive offer 48 may include an incentive corresponding to a first different online game (not shown) which aims to encourage user activity within the first different online game (e.g., such that the user may be more active in the different online game than the current online game).

Returning to FIG. 1, the offer determination module 24 may be configured to select incentive offers to be delivered to the users of the online game from the multiple incentive offers based on the monitored user activity parameters of the users by the user monitor module 20. Offers including incentives corresponding to the online game may be selected for users who are indicated as being generally active in the online game, wherein such incentives are intended to encourage the user to continue activity within the online game and/or encourage more activity within the game, to enhance the gameplay experience in the online game. Offers including incentives corresponding to the online game may also be selected for users who are indicated as being inactive in the online game and/or that their activity in the game is likely to lapse, wherein such incentives are intended encourage the user to be more active within the online game. Offers including incentives corresponding to the different online games may be selected for users who are generally considered inactive, that their activity in the game is likely to lapse, and/or for users who are unresponsive to previous offers corresponding to the online game, wherein such offers may encourage the user to play a different game such that the user may be more active in the other game than in the current game.

Offers including incentives corresponding to the online game may be selected for users who are indicated as being generally active in the online game. By offering incentives to users who are already considered active within the online game (e.g., as indicated by the user monitor module 20), the users are more likely to positively respond to the offer since the offer is relevant to their activity within the game. Such offers may provide a mechanism for active users to further enhance gameplay and maintain and/or encourage more activity within the online game.

Offers including incentives corresponding to the online game may also be selected for users who are indicated as being inactive in the online game and/or that their activity in the game is likely to lapse (e.g., as indicated by the user monitor module 20). Such incentive offers may provide a mechanism to engage the users to become more active in the online game such that their activity will be less likely to lapse within the online game.

Offers including incentives corresponding to the different online games may be selected for users who are generally considered inactive and/or that their activity in the game is likely to lapse (e.g., as indicated by the user monitor module 20). The indication may provide an insight that the user does not wish to continue activity in the online game, therefore by encouraging the user to play a different online game and/or games, and by providing an incentive to play the different game and/or games, the users may be encouraged to be more active in the different online games than in the current online game.

Offers including incentives corresponding to the different online games may be selected for users who are unresponsive to one or more previous offers corresponding to the online game. Offers including incentives corresponding to the different online games may be selected for users who are unresponsive to one or more previous offers corresponding to the online game regardless of the user's activity level in the current online game. Offers including incentives corresponding to the different online games may be selected for users who are unresponsive for a given time period to previous offers corresponding to the online game. The time period may be a time period which is set by the offer determination module 24, for example, 60 days (or other amount).

For example, referring now to FIG. 1, the offer determination module 24 may be configured to select 50 the first incentive offer 46 for delivery to the first user 29 based on the monitored user activity parameters 34 of the first user 29. The offer determination module 24 may be configured to select 52 the second incentive offer 48 for delivery to the second user 31 based on the monitored user activity parameters 34 of the second user 31.

The offer determination module 24 may select the second offer 48 for delivery to the second user 31 based at least in part on the second user 31 having played the first different online game (e.g., not shown) at least once. The offer determination module 24 may be configured to select the second offer 48 for delivery to the second user 31 based at least in part on the second user 31 having never played the first different online game.

The offer determination module 24 may be configured such that by virtue of the first user spend parameter 36 for the first user 29 and the second user spend parameter 37 for the second user 31 indicating (e.g., by the user monitor module 20) activity of the second user 31 in the online game is more likely to lapse than activity of the first user 29 in the online game, selection 50 of the first incentive offer 46 for the first user 31 is based on the first user spend parameter 36 for the first user 29, and selection 52 of the second incentive offer 48 for the second user 31 is based on the second user spend parameter 37 for the second user 31. For example, the first user spend parameter 36 may indicate that the first user 29 is has a "Very Active" total spending parameter (e.g., spends a lot of virtual coins), the first incentive 46 offer may be "Spend 10 Coins and receive a Bonus Reward!", therefore by virtue of the user monitor module 20 indicating "Very Active" total spending, the first incentive 46 (e.g., a reward as a result of spending) is selected 50 since the incentive is relevant to the first user 29 activity. As another example, the second user spend parameter 37 may indicate that the second user 31 is has a "Not Active" total spending parameter (e.g., does not spend virtual coins), the second incentive 46 offer may be "Register to play [first different game] and receive 3 free items!", therefore by virtue of the user monitor module 20 indicating "Not Active" total spending, the second incentive 48 (e.g., a non-currency reward as a result of playing a different game) is selected 52 since the incentive is relevant to the second user 31 activity.

The offer determination module 24 may be configured such that, by virtue of the first user interaction parameters 38 for the first user 29 and the second user interaction parameters 39 for the second user 31 indicating (e.g., by the user monitor module 20) activity of the second user 31 in the online game is more likely to lapse than activity of the first user 29 in the online game, selection 50 of the first incentive offer 46 for the first user 29 is based on the first user interaction parameter 38 for the first user 29, and selection 52 of the second incentive offer 48 for the second user 31 is based on the second user interaction parameter 39 for the second user 31. For example, the first user interaction parameter 38 may indicate that the first user 29 is has a "Very Active" user interaction parameter 38 (e.g., completes a lot of game related tasks), the first incentive 46 offer may be "Complete 3 more tasks and receive a Bonus Reward!", therefore by virtue of the user monitor module 20 indicating "Very Active" task completion, the first incentive 46 (e.g., a reward as a result of completing tasks) is selected 50 since the incentive is relevant to the first user 29 activity. The second user interaction parameter 39 may indicate that the second user 31 is has "Not Active" at completing game related tasks, the second incentive 46 offer may be "Register to play [first different game] and receive a faster time warp!", therefore by virtue of the user monitor module 20 indicating "Not Active" at task completion, the second incentive 48 (e.g., an upgrade to speed through the completion of tasks as a result of playing a different game) is selected 52 since the incentive is relevant to the second user 31 activity.

The offer determination module 24 may be configured such that, by virtue of the first user progress parameters 40 for the first user 29 and the second user progress parameters 41 for the second user 31 indicating (e.g., by the user monitor module 20) activity of the second user 31 in the online game is more likely to lapse than activity of the first user 29 in the online game, selection 50 of the first incentive offer 46 for the first user 29 is based on the first user progress parameter 40 for the first user 29, and selection 52 of the second incentive offer 48 for the second user 31 is based on the second user progress parameter 41 for the second user 31. For example, the first user progress parameter 40 may indicate that the first user 29 is "Very Active" at completing game related objectives (e.g., complete levels), the first incentive 46 offer may be "Complete 3 more levels and receive a Bonus Reward!", therefore by virtue of the user monitor module 20 indicating "Very Active" level completion, the first incentive 46 (e.g., a reward as a result of completing levels) is selected 50 since the incentive is relevant to the first user 29 activity. The second user progress parameter 41 may indicate that the second user 31 is "Not Active" at completing game related objectives, the second incentive 46 offer may be "Register to play [first different game] and automatically skip level 1 !", therefore by virtue of the user monitor module 20 indicating "Not Active" at objective completion (e.g., level completion), the second incentive 48 (e.g., skip levels as a result of playing a different game) is selected 52 since the incentive is relevant to the second user 31 activity.

The offer determination module 24 may be configured such that, by virtue of the first user interest parameters 42 for the first user 29 and the second user interest parameters 43 for the second user 31 indicating (e.g., by the user monitor module 20) activity of the second user 31 in the online game is more likely to lapse than activity of the first user 29 in the online game, selection 50 of the first incentive offer 46 for the first user 29 is based on the first user interest parameter 42 for the first user 29, and selection 52 of the second incentive offer 48 for the second user 31 is based on the second user interest parameter 43 for the second user 31. For example, the first user interest parameter 42 may indicate that the first user 29 is "Very Active" at logging into the online game, the first incentive 46 offer may be "Log in 10 more times this week and receive a Bonus Reward!", therefore by virtue of the user monitor module 20 indicating "Very Active" log in, the first incentive 46 (e.g., a reward as a result of logging in) is selected 50 since the incentive is relevant to the first user 29 activity. The second user interest parameter 43 may indicate that the second user 31 is "Not Active" at logging in, the second incentive 46 offer may be "Register to play [first different game] and at your first log-in receive a bonus reward!" therefore by virtue of the user monitor module 20 indicating "Not Active" at logging in, the second incentive 48 (e.g., receive a bonus only after 1 log in to a different game) is selected 52 since the incentive is relevant to the second user 31 activity.

The offer determination module 24 may be configured such that, by virtue of the first user communications parameters 44 for the first user 29 and the second user communications parameters 45 for the second user 31 indicating (e.g., by the user monitor module 20) activity of the second user 31 in the online game is more likely to lapse than activity of the first user 29 in the online game, selection 50 of the first incentive offer 46 for the first user 29 is based on the first user communications parameter 44 for the first user 29, and selection 52 of the second incentive offer 48 for the second user 31 is based on the second user communications parameter 45 for the second user 31. For example, the first user communications parameter 44 may indicate that the first user 29 is "Very Active" at communicating with other players, the first incentive 46 offer may be "Reach out to 2 more players in the chat window and receive a Bonus Reward!", therefore by virtue of the user monitor module 20 indicating "Very Active" player-to-player communication, the first incentive 46 (e.g., a reward as a result of communicating with more players) is selected 50 since the incentive is relevant to the first user 29 activity. The second user communications parameter 45 may indicate that the second user 31 is "Not Active" at communicating with other players, the second incentive 46 offer may be "Register to play [first different game] and automatically be connected to 10 players!" therefore by virtue of the user monitor module 20 indicating "Not Active" at player-to-player communication, the second incentive 48 (e.g., automatically connect with players for playing a different game) is selected 52 since the incentive is relevant to the second user 31 activity.

The server 12, client computing platforms 28, and/or external resources 32 may be operatively linked via one or more electronic communication links. For example, such electronic communication links may be established, at least in part, via a network 26 such as the Internet and/or other networks. It will be appreciated that this is not intended to be limiting, and that the scope of this disclosure includes implementations in which servers 12, client computing platforms 28, and/or external resources 32 may be operatively linked via some other communication media.

The external resources 32 may include sources of information, hosts and/or providers of virtual environments outside of system 10, external entities participating with system 10, external entities for player-to-player communications, and/or other resources. In some implementations, some or all of the functionality attributed herein to external resources 32 may be provided by resources included in system 10.

The server 12 may include electronic storage 25, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 25 may comprise electronic storage media that electronically stores information. The electronic storage media of electronic storage 25 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 25 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 25 may include one or more virtual storage resources (e.g., cloud storage, a virtual private network, and/or other virtual storage resources). Electronic storage 25 may store software algorithms, information determined by processor 14, information received from server 12, information received from client computing platforms 28, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20, 22, 24. Processor 14 may be configured to execute modules 16, 18, 20, 22, 24 by software; hardware; firmware; some combination of software, hardware, and/or firmware; and/or other mechanisms for configuring processing capabilities on processor 14.

It should be appreciated that although modules 16, 18, 20, 22, 24 are illustrated in FIG. 1 as being co-located within a single processing unit, in implementations in which processor 14 includes multiple processing units, one or more of modules 16, 18, 20, 22, 24 may be located remotely from the other modules. The description of the functionality provided by the different modules 16, 18, 20, 22, 24 described above is for illustrative purposes, and is not intended to be limiting, as any of modules 16, 18, 20, 22, 24 may provide more or less functionality than is described. For example, one or more of modules 16, 18, 20, 22, 24 may be eliminated, and some or all of its functionality may be provided by other ones of modules 16, 18, 20, 22, and/or 24, and/or other modules. As another example, processor 14 may be configured to execute one or more additional modules that may perform some or all of the functionality attributed below to one of modules 16, 18, 20, 22, 24.

Figure 3:
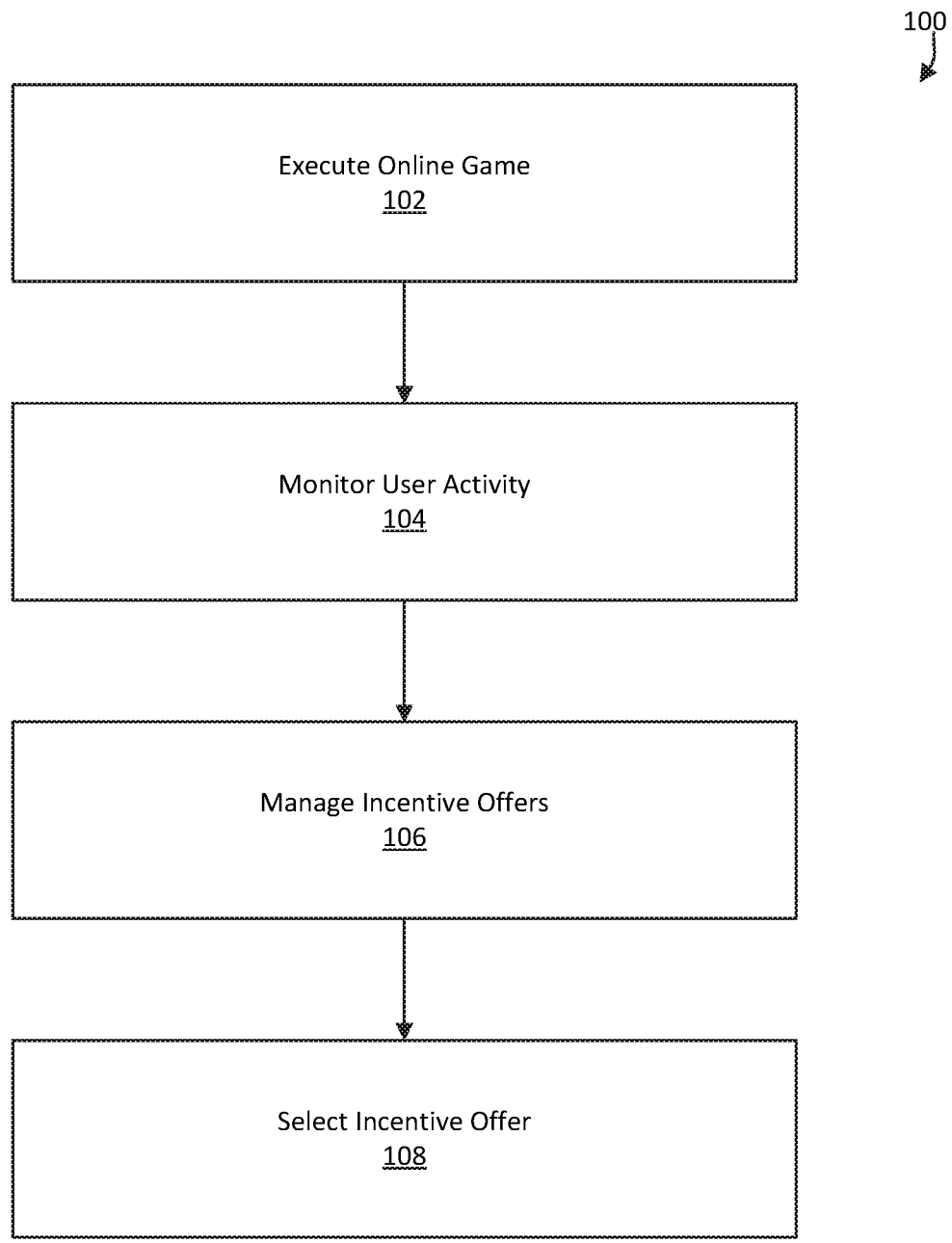
FIG. 3 illustrates a method for serving advertisement content to users of an online game.

FIG. 3 illustrates method 100 for hosting a virtual environment to client computing devices 28 for dynamically serving advertising content to the users. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at an operation 102 an instance of an online game is executing for presentation to users at client computing devices. The online game may facilitate participation of the users in the online game. In some implementations, operation 102 may be performed by a game module the same as or similar to game module 16 (shown in FIG. 1 and described herein).

At an operation 104, user activity is monitored. Monitoring user activity may include monitoring user activity parameters that characterize one or more of past spending by the users on virtual items, past user interaction with game related tasks, user progress with one or more overall game related objectives, user interest in the game, and past in-game communications including player-to-player communications. Monitoring may include monitoring activity parameters of a first user and activity parameters of a second user. In some implementations, operation 104 may be performed by a user monitor module the same as or similar to the user monitor module 20 (shown in FIG. 1 and described herein).

At an operation 106, multiple incentive offers are managed. The multiple incentive offers may be offers which are available for delivery to the users of the online game. The offers may include incentives corresponding to the online game and incentives corresponding to one or more different online games. The offers may include a first incentive offer including an incentive corresponding to the online game, and a second incentive offer including an incentive corresponding to a first different online game. In some implementations, operation 106 may be performed by a potential offer module the same as or similar to potential offer module 22 (shown in FIG. 1 and described herein).

At an operation 108, offers are selected for deliver to the users of the online game. Selecting incentive offers to be delivered to the users of the online game from the multiple incentive offers may be based on the monitored activity parameters of the users. Selecting offers may include selecting the first incentive offer for delivery to the first user based on the monitored activity parameters of the first user, and selecting the second incentive offer for delivery to the second user based on the monitored activity parameters of the second user. In some implementations, operation 108 may be performed by an offer determination module the same as or similar to offer determination module 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system for dynamically serving advertisements to users based on user parameters, the system comprising:

one or more processors configured by machine-readable instructions to:

execute an instance of an online game, and to implement the instance of the online game to facilitate participation of users in the online game;

monitor user activity parameters that characterize one or more of past spending by the users on virtual items, past user interaction with game related tasks, user progress with one or more overall game related objectives, user interest in the game, and past in-game communications including player-to-player communications, such that the user activity parameters of a first user and the user activity parameters of a second user are monitored;

manage multiple incentive offers which are available for delivery to the users of the online game, the offers including incentives corresponding to the online game and/or incentives corresponding to one or more different online games, the offers including a first incentive offer including an incentive corresponding to the online game, and a second incentive offer including an incentive corresponding to a first different online game;

determine a likelihood of activity lapse for individual ones of the users based on the user activity parameters, an activity lapse being a cessation of a user's activity in the online game and/or a decrease of at least a threshold amount in the user's activity in the online game, such that a first likelihood of activity lapse is determined for the first user and a second likelihood of activity lapse is determined for the second user;

transmit incentive offers to client computing platforms associated with the users of the online game based on the likelihood of activity lapse determined for the users, such that the first incentive offer is transmitted to a first client computing platform associated with the first user based on the first likelihood of activity lapse determined for the first user, the first incentive offer including first action requirements for completion by the first user within the online game, and the second incentive offer is transmitted to a second client computing platform associated with the second user based on the second likelihood of activity lapse determined for the second user, the second incentive offer including second action requirements for completion by the second user within the online game; and transmit incentives to the users within the online games in response to users completing action requirements associated with the incentive offers within the online game, such that a first incentive associated with the first incentive offer is transmitted to a first user based on completion of the first action requirements by the first user within the online game, and a second incentive associated with the second incentive offer is transmitted to a second user based on completion of the first action requirements by the second user within the online game.

2. The system of claim 1 wherein the one or more processors are further configured by machine-readable instructions such that:

the user activity parameters include a user spend parameter that characterizes past spending by the users, the user spend parameter for the first user and the user spend parameter for the second user indicating activity of the second user in the online game is more likely to lapse than activity of the first user in the online game, transmission of the first incentive offer to the first client computing platform associated with the first user is based on the user spend parameter for the first user and the first likelihood of activity lapse determined for the first user, and transmission of the second incentive offer to the second client computing platform associated with the second user is based on the user spend parameter for the second user and a second likelihood of activity lapse determined for the second user.

3. The system of claim 2 wherein the one or more processors are configured by machine-readable instructions such that user spend parameters comprise one or more of spend velocity parameters, spend frequency parameters, and total spend amount parameters.

4. The system of claim 1 wherein the one or more processors are further configured by machine-readable instructions such that:

the user activity parameters include a user interaction parameter that characterizes past interaction of the users with game related tasks, the user interaction parameter for the first user and the user interaction parameter for the second user indicating activity of the second user in the online game is more likely to lapse than activity of the first user in the online game, transmission of the first incentive offer to the first client computing platform associated with the first user is based on the user interaction parameter for the first user, and transmission of the second incentive offer to the second client computing platform associated with the second user is based on the user interaction parameter for the second user.

5. The system of claim 1 wherein the one or more processors are further configured by machine-readable instructions such that:

the user activity parameters include a user progress parameter that characterizes user progress with one or more overall game related objectives, the user progress parameter for the first user and the user progress parameter for the second user indicating activity of the second user in the online game is more likely to lapse than activity of the first user in the online game, transmission of the first incentive offer to the first client computing platform associated with the first user is based on the user progress parameter for the first user, and transmission of the second incentive offer to the second client computing platform associated with the second user is based on the user progress parameter for the second user.

6. The system of claim 1 wherein the one or more processors are further configured by machine-readable instructions such that:

the user activity parameters include a user interest parameter that characterizes user interest in the game, the user interest parameter for the first user and the user interest parameter for the second user indicating activity of the second user in the online game is more likely to lapse than activity of the first user in the online game, transmission of the first incentive offer to the first client computing platform associated with the first user is based on the user interest parameter for the first user, and transmission of the second incentive offer to the second client computing platform associated with the second user is based on the user interest parameter for the second user.

7. The system of claim 6 wherein the one or more processors are further configured by machine-readable instructions such that the user interest parameters are based, at least in part, on the frequency of logging into the game by the users.

8. The system of claim 6 wherein the one or more processors are further configured by machine-readable instructions such that the user interest parameters are based, at least in part, on past user responses to offers including an incentive corresponding to the online game.

9. The system of claim 1 wherein the one or more processors are further configured by machine-readable instructions such that:

the user activity parameters include a user communications parameter that characterizes past in-game communications by the users including player-to-player communications, the user communications parameter for the first user and the user communications parameter for the second user indicating activity of the second user in the online game is more likely to lapse than activity of the first user in the online game, transmission of the first incentive offer to the first client computing platform associated with the first user is based on the user communications parameter for the first user, and transmission of the second incentive offer to the second client computing platform associated with the second user is based on the user communications parameter for the second user.

10. The system of claim 1 wherein the one or more processors are further configured by machine-readable instructions such that the offers including incentives corresponding to one or more different online games include offer corresponding to games which the users have played at least once, such that transmitting the second offer to the second client computing platform for delivery to the second user, wherein the second offer includes incentives corresponding to the first different online game, is based at least in part on the second user having played the first different online game at least once.

11. The system of claim 1 wherein the one or more processors are configured by machine-readable instructions such that the offers including incentives corresponding to one or more different online games include offers corresponding to games which the users have not played, such that the second offer includes incentives corresponding to the first different online game and is based at least in part on the second user having never played the first different online game.

12. A method for dynamically serving advertisements to users based on user parameters, the method being implemented in a computer system that includes one or more physical processors and storage media storing machine-readable instructions, the method comprising:

executing an instance of an online game, and to implementing the instance of the online game to facilitate participation of users in the online game;

monitoring user activity parameters that characterize one or more of past spending by the users on virtual items, past user interaction with game related tasks, user progress with one or more overall game related objectives, user interest in the game, and past in-game communications including player-to-player communications, including monitoring the user activity parameters of a first user and the user activity parameters of a second user;

managing multiple incentive offers which are available for delivery to the users of the online game, the offers including incentives corresponding to the online game and incentives corresponding to one or more different online games, the offers including a first incentive offer including an incentive corresponding to the online game, and a second incentive offer including an incentive corresponding to a first different online game;

determining a likelihood of activity lapse for individual ones of the users based on the user activity parameters, an activity lapse being a cessation of a user's activity in the online game and/or a decrease of at least a threshold amount in the user's activity in the online game, such that a first likelihood of activity lapse is determined for the first user and a second likelihood of activity lapse is determined for the second user;

transmitting incentive offers to client computing platforms associated with the users of the online game based on the likelihood of activity lapse determined for the users, including transmitting the first incentive offer to a first client computing platform associated with the first user based on the likelihood of activity lapse determined for the first user, the first incentive offer including first action requirements for completion by the first user within the online game, and transmitting the second incentive offer to a second client computing platform associated with the second user based on the second likelihood of activity lapse determined for the second user, the second incentive offer including second action requirements for completion by the second user within the online game; and transmitting incentives to the users within the online games in response to users completing action requirements associated with the incentive offers within the online game, such that a first incentive associated with the first incentive offer is transmitted to a first user based on completion of the first action requirements by the first user within the online game, and a second incentive associated with the second incentive offer is transmitted to a second user based on completion of the first action requirements by the second user within the online game.

13. The method of claim 12 additionally including:
monitoring a user spend parameter that characterizes past spending by the users, wherein the user spend parameter for the first user and the user spend parameter for the second user indicating activity of the second user in the online game is more likely to lapse than activity of the first user in the online game;
transmitting the first incentive offer to the first client computing platform associated with the first user based on the user spend parameter for the first user and the first likelihood of activity lapse determined for the first user; and
transmitting the second incentive offer to the second client computing platform associated with the second user based on the user spend parameter for the second user and a second likelihood of activity lapse determined for the second user.

14. The method of claim 13 wherein the user spend parameters comprise one or more of spend velocity parameters, spend frequency parameters, and total spend amount parameters.

15. The method of claim 12 additionally including:
monitoring a user interaction parameter that characterizes past interaction of the users with game related tasks, wherein the user interaction parameter for the first user and the user interaction parameter for the second user indicating activity of the second user in the online game is more likely to lapse than activity of the first user in the online game;
transmitting the first incentive offer to the first client computing platform associated with the first user based on the user interaction parameter for the first user; and
transmitting the second incentive offer to the second client computing platform associated with the second user based on the user interaction parameter for the second user.

16. The method of claim 12 additionally including:
monitoring a user progress parameter that characterizes user progress with one or more overall game related objectives, wherein the user progress parameter for the first user and the user progress parameter for the second user indicating activity of the second user in the online game is more likely to lapse than activity of the first user in the online game;
transmitting the first incentive offer to the first client computing platform associated with the first user based on the user progress parameter for the first user, and
transmitting the second incentive offer to the second client computing platform associated with the second user based on the user progress parameter for the second user.

17. The method of claim 12 additionally including:
monitoring a user interest parameter that characterizes user interest in the game, wherein the user interest parameter for the first user and the user interest parameter for the second user indicating activity of the second user in the online game is more likely to lapse than activity of the first user in the online game;

transmitting the first incentive offer to the first client computing platform associated with the first user based on the user interest parameter for the first user, and transmitting the second incentive offer to the second client computing platform associated with the second user based on the user interest parameter for the second user.

18. The method of claim 17 wherein the user interest parameters are based, at least in part, on the frequency of logging into the game by the users.

19. The method of claim 17 wherein the user interest parameters are based, at least in part, on past user responses to offers including incentives corresponding to the online game.

20. The method of claim 12 additionally including:

monitoring a user communications parameter that characterizes past in-game communications by the users including player-to-player communications, wherein the user communications parameter for the first user and the user communications parameter for the second user indicating activity of the second user in the online game is more likely to lapse than activity of the first user in the online game;

transmitting the first incentive offer to the first client computing platform associated with the first user based on the user communications parameter for the first user, and transmitting the second incentive offer to the second client computing platform associated with the second user based on the user communications parameter for the second user.

21. The method of claim 12 wherein the offers including incentives corresponding to one or more different online games include offers corresponding to games which the users have played at least once, such that transmitting the second offer to the second client computing platform for delivery to the second user, wherein the second offer includes incentives corresponding to the first different online game, is based at least in part on the second user having played the first different online game at least once.

22. The method of claim 12 wherein the offers including incentives corresponding to one or more different online games include offers corresponding to games which the users have not played, such that transmitting the second offer to the second client computing platform for delivery to the second user, wherein the second offer includes incentives corresponding to the first different online game, is based at least in part on the second user having never played the first different online game.

* * * * *